June 11, 1968   F. J. RYCHLIK   3,387,503
POWER TRANSMISSION AND CLUTCH MECHANISM
Filed Feb. 21, 1967
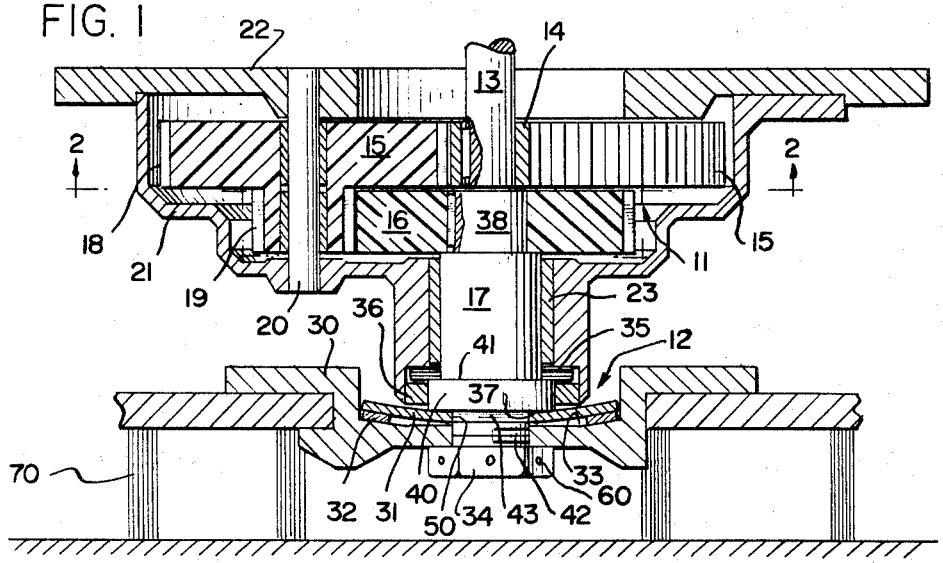
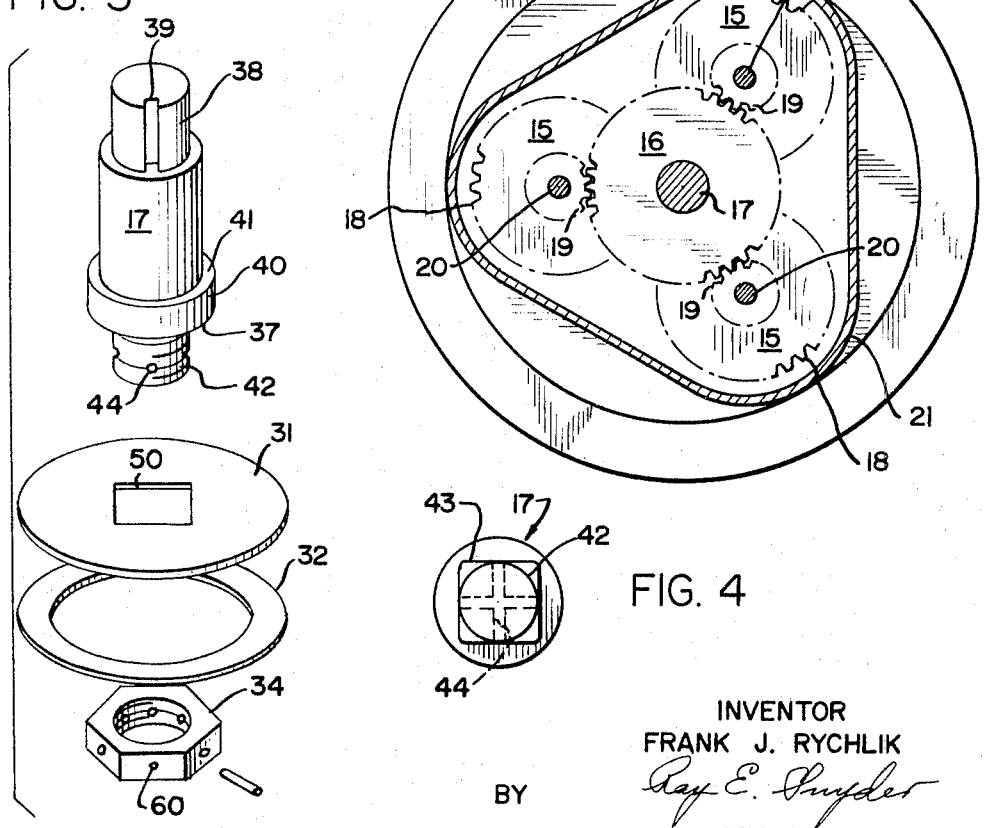
INVENTOR
FRANK J. RYCHLIK
BY Ray E. Snyder
ATTORNEY United States Patent Office 3,387,503
Patented June 11, 1968

3,387,503
POWER TRANSMISSION AND CLUTCH
MECHANISM
Frank J. Rychlik, 3484 Whirlaway Drive,
Northbrook, Ill. 60062
Filed Feb. 21, 1967, Ser. No. 617,523
5 Claims. (Cl. 74—411)

ABSTRACT OF THE DISCLOSURE

A combined speed reducing transmission constructed of partially self-lubricating plastic gears and a unique slip-clutch for use between a rotatable driving source and a driven member and effective to absorb shock loads without damage to the transmission or to the driving source, and operable without loss of lubricant from the transmission housing.

BACKGROUND OF THE INVENTION

(1) Field of the invention

This invention relates to machine elements and mechanisms and more particularly to gearing in series with a frictional torque transmitting element. The transmission and clutch mechanism of the present invention may be used in a floor polishing machine and the like, or in other applications where the transmission may be subject to shock loads.

(2) Description of the prior art

The transmissions in most commercially available floor polishing machines are generally larger, noisier, and more expensive than is necessary for the amount of power transmitted in normal operation. This over-design is necessary to protect the transmission or driving motor from damage when its rotating brush strikes a rough surface or obstacle. It is also common practice to provide more than one size transmission for different size machines, thereby losing some economies of scale.

The transmissions most commonly comprise a gear set made of metal gears. These gears require lubrication with a free flowing lubricant. Leakage of this lubricant during shipment or storage is a nuisance and even more so during the operation of polishing a floor.

The patent to W. E. Holt, No. 2,817,977, entitled "Drive Unit for Floor Treating Machines" is illustrative of the general type of transmission and of an attempt to prevent the loss of lubricating fluid. Holt accomplishes this by providing a seal which prevents the upward flow of lubricant.

SUMMARY OF THE INVENTION

The present invention provides a combined speed-reducing gear set and slip-clutch mechanism that is economical to manufacture, relatively quiet, and effective to transmit torque from a rotating driving source to a rotatable driven member over a normal operating range, but is effective to release when an overload or shock load condition occurs and thereby protect the transmission and driving source from damage. The gears comprising the transmission are preferable molded of a partially self-lubricating plastic to provide quiet operation and economy in manufacture. The slip-clutch mechanism includes a deformable resilient disc that can be adjusted to transmit a predetermined maximum torque and to release on any greater torque, the adjustment being accomplished by the same operation employed in attaching the driven member to the transmission.

BRIEF DESCRIPTION OF THE DRAWINGS

FIG. 1 is a cross-sectional view of the transmission and clutch mechanism of the present invention;

FIG. 2 is a reduced sectional view taken on line 2—2 of FIG. 1;

FIG. 3 is an exploded view of portions of FIG. 1; and

FIG. 4 is an end view of a portion of FIG. 3.

Like characters of reference designate like parts in the several views.

DESCRIPTION OF THE PREFERRED EMBODIMENT

The transmission and clutch mechanism of the present invention is designated generally by the numeral 10 and comprises a gear set 11 and a slip-clutch mechanism 12.

The gear set 11 comprises an input shaft 13 carrying an input gear 14, a single or plurality of stepped pinions 15, and an output gear 16 mounted on an output or bull shaft 17. The pinions 15 are each formed with a large diameter gear 18 in mesh with the input gear 14 and a small diameter gear 19 in mesh with the output gear 16. The pinions are rotatably disposed on shafts 20 mounted within two halves 21 and 22 of a housing or casing for the gear set 11. The gear set 11 is intended to produce an overall speed reduction of about 10:1 between the input shaft 13 and output shaft 17. The output shaft 17 is journalled in a sleeve bearing 23 contained within the casing 22.

The clutch mechanism 12 comprises the bull shaft 17 which is common with the output from the gear set 11, an annular output member 30, a clutch disc 31, and a facing plate or washer 32. The washer 32 is interposed between the disc 31 and an inclined or beveled annular surface 33 formed on the output member 30. The output member 30 is mounted for relative rotation with respect to the shaft 17 and is retained by a lock-nut 34. A thrust bearing 35 and grease retainer ring 36 are disposed within the casing 22 surrounding the bull shaft 17 and adjacent to the clutch mechanism 12. The shaft 17 is formed with a shoulder 37 abutting the clutch disc 31.

Referring now to detailed FIG. 3, the exposed view shows the bull shaft 17 formed at one end with a reduced diameter portion 38 and a keyway 39 for retaining the output gear 16, and an enlarged shoulder 40 having radial faces 41 and 37. The shaft 17 is formed at its other end with threads 42, a rectangular shoulder 43, and a plurality of radial bores 44. The surface 41, when assembled, bears against the thrust washer 35. The clutch disc 31 is formed with a rectangular central aperture 50 adapted to mate with the shoulder 43 abutting the face 37. The washer 32 is in frictional contact with the disc 31 and the annular output member 30 which is retained on the shaft 17 by the nut 34. The nut 34 is formed with a plurality of radial bores 60 which are adapted to be aligned with the radial bores 44 for receiving a locking pin or key 61.

The clutch disc 31 may be formed of spring steel and in a preferred embodiment may have a diameter of 2⅝ inches and a thickness of .093 inch. The washer 32 preferably is formed by a blanking operation so as to have an inclined or beveled face conforming to the surface 33. The washer 32 may be made of brass and should be of the same diameter as the disc 31. When the disc 31, washer 32, and output member 30 are assembled on the bull shaft 17, the advance of the nut 34 tends to stress and deform the disc 31 into a dish-like configuration, and is forced to conform with the shape of the washer 32 and beveled surface 33. The inclined surface 33 may be formed to subtend an angle of approximately 4° with a normal radial plane.

As explained above, the output member 30 is assembled on the bull shaft 17 and retained by the nut 34. The advance of the nut 34 stresses the disc 31 between the shoulder 37 and washer 32 and thereby also establishes the force of frictional engagement between the disc 31 and output member 30. When assembled for operation, the clutch disc 31 and washer 32 are normally imbedded in non-flowing grease. For normal operation, the frictional force established is sufficient to transmit torque from the shaft 17 to the output member 30 without slippage. When an overload condition occurs, however, the disc 31 does slip and such overload is not reflected back to the gear set 11 or the driving source. Slippage will continue until the overload condition is removed. Any wear due to slippage will take place primarily on the brass washer 32 which can be easily replaced. Both the disc 31 and washer 32 are retained in a well or cavity 45 formed in the output member 30 so as to provide a well balanced, compact unit.

In normal operation in a floor polishing machine, the output member 30 may carry an annular brush 70. The rotating brush 70 imposes some frictional drag on the mechanism 10 due to its contact with a floor. An overload or shock load may occur when the brush 70 strikes a rough surface such as bare concrete or the like. This sudden shock load might be sufficient to damage the transmission in an ordinary polishing machine, but in the present invention, such a shock load will be absorbed by the clutch mechanism 12 and such damage cannot occur. Also, with the provision of this protective clutch mechanism 12, it is not necessary to employ gears stronger than necessary to transmit torque over the normal operating range. This permits the use of gears 15 and 16 molded from suitable plastic material. The plastic gears are substantially lower in cost and quieter in operation than their metal counterparts.

As an example, the gears may be molded from commercially available materials such as "Nylotron" which has incorporated therein approximately 4% molybdenum disulphide. The molybdenum disulphide makes the gears partially self-lubricating so that very heavy grease, one that does not flow below 300° F., may be used within the transmission casing.

While the clutch mechanism 12 has been shown in combination with a speed-reducing gear set, it is to be understood that this clutch mechanism 12 can be used advantageously with other types of speed changing mechanisms.

There has been provided by this invention a novel power transmission mechanism that is economical to manufacture, easy to assembly and repair, and self protected from damage due to overload or shock load conditions. While a specific embodiment has been shown and described, this preferred embodiment should not be construed as a limitation to the invention except insofar as the claims may be so limited.

I claim:
1. The combination of a speed changing mechanism having a rotatable input shaft adapted to be driven from a power source in series with an overload release friction engaging clutch adapted to drive a rotatable output member, said clutch comprising:
 a common or bull shaft interconnecting said speed changing mechanism and said clutch with said output member;
 friction engaging means including a deformable resilient disc carried by said bull shaft and adapted to engage said output member; and
 adjustable attachment means carried by said bull shaft and effective to attach said output member to said bull shaft and also effective to adjust said friction engaging means to release at some predetermined overload condition.

2. The combination as claimed in claim 1 wherein said output member is formed with a beveled surface adapted to mate with said disc.

3. The combination as claimed in claim 2 with a beveled washer interposed between said disc and said output member.

4. The combination as claimed in claim 1 wherein said speed changing mechanism is a gear set comprising a plurality of molded plastic gears.

5. The combination as claimed in claim 4 wherein said gears are molded of a suitable plastic containing about 4% molybdenum disulphide.

References Cited
UNITED STATES PATENTS

| | | |
|---|---|---|
| 2,759,368 | 8/1956 | Kitto. |
| 2,774,252 | 12/1956 | Meyer _____ 74—411 X |
| 3,154,963 | 11/1964 | Caley et al. _____ 74—421 |

FRED C. MATTERN, JR., *Primary Examiner.*

LEONARD H. GERIN, *Examiner.*